United States Patent Office 2,979,167
Patented Apr. 11, 1961

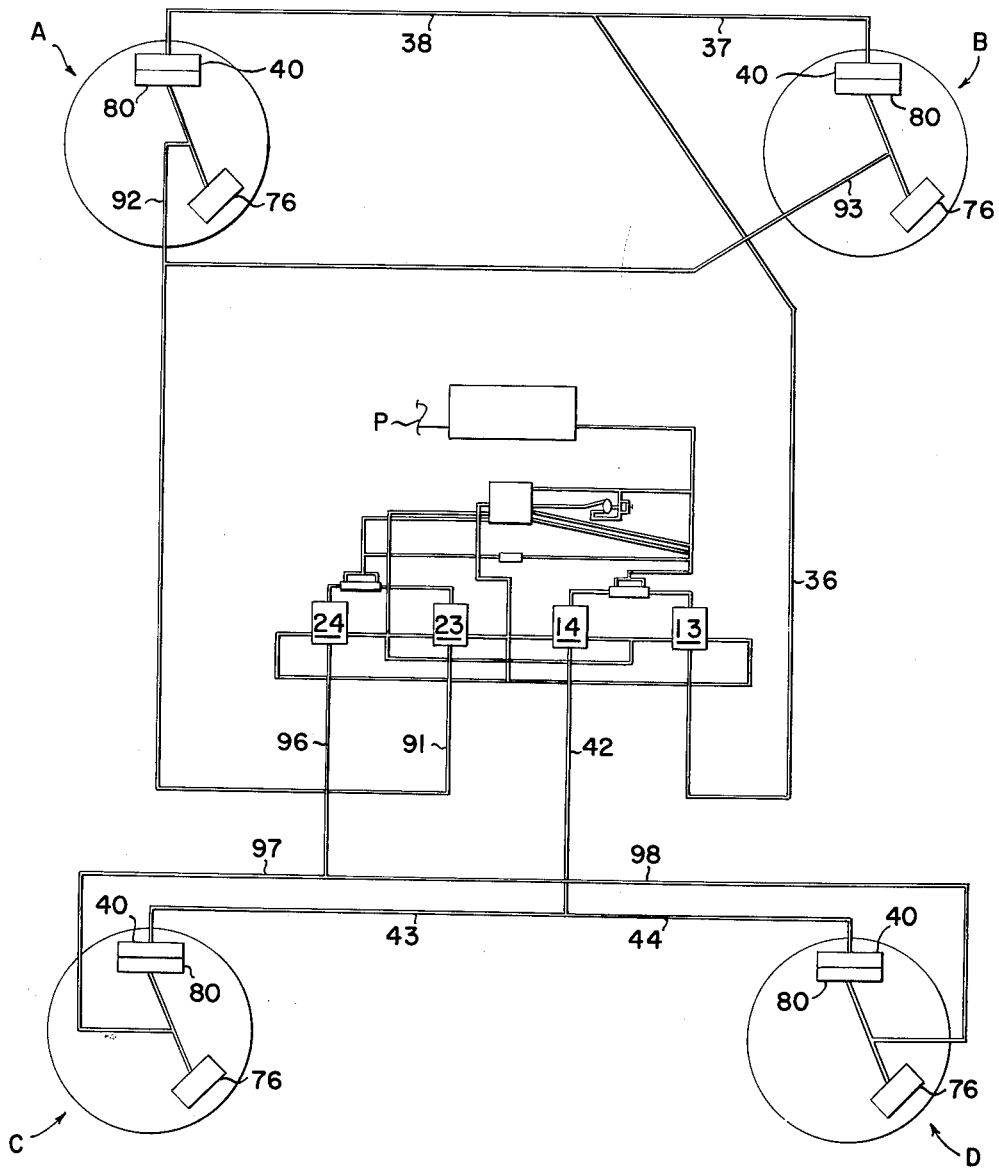

2,979,167
HYDRAULICALLY OPERATED, MECHANICALLY POWERED SAFETY BRAKE SYSTEM

Albert P. Denis, 46 Alvin St., Springfield, Mass.; Marguerite D. Sullivan, administratrix of the estate of Albert P. Denis, deceased Filed Mar. 6, 1958, Ser. No. 719,678

13 Claims. (Cl. 188—141)

This invention relates to an improvement in brake systems, more particularly for automotive vehicles including aircraft, trailers and the like, and in power equipment generally where it is desired to employ braking action.

One object of the invention is to provide a more reliable and safer power braking system including a combination of mechanical and hydraulic features which will assure braking action under substantially all running conditions, and in which, in the event of a break in any of the hydraulic lines loss of fluid is so restricted that power is not lost in other lines.

Another object is to provide a brake system in which the braking power is substantially proportional to the speed of the vehicle, that is, greater speeds, or revolutions of the wheels produce proportionately greater braking power, thus reducing the danger of over-powerful brakes or sudden stops at slow speeds, in that the speed of the vehicle at the time the brake is applied automatically determines in great part the amount of braking power applied, the kinetic energy of the moving vehicle being the power source.

Another object is to provide a braking system flexible in its application, in other words the principle of which may be variously applied to meet the braking requirements of various types of vehicles or their operation under various specialized conditions.

Other and further objects and advantages will be made apparent from the disclosure of the accompanying drawings and in the following specification and claims.

In the accompanying drawings,

Fig. 1 is a diagrammatic view showing, partly in section, exemplifications of the various elements, and the relationship thereof, in a braking system embodying the invention;

Fig. 2 is a view on a larger scale with parts in section or broken away of the master hydraulic cylinder, the master check valve and the intermediate control cylinders through which initial foot pressure is hydraulically applied to the brakes initiating the hydraulic application of mechanically created pressure, powered by the kinetic energy of the moving vehicle, and by which loss of fluid and braking action is restricted in the event of a break in one of the lines;

Fig. 6 is a diagrammatic view of the hydraulic system for a four wheel braking system; and Fig. 7 is a detail sectional view, on a larger scale, of an alternative valve arrangement.

Figure 1:
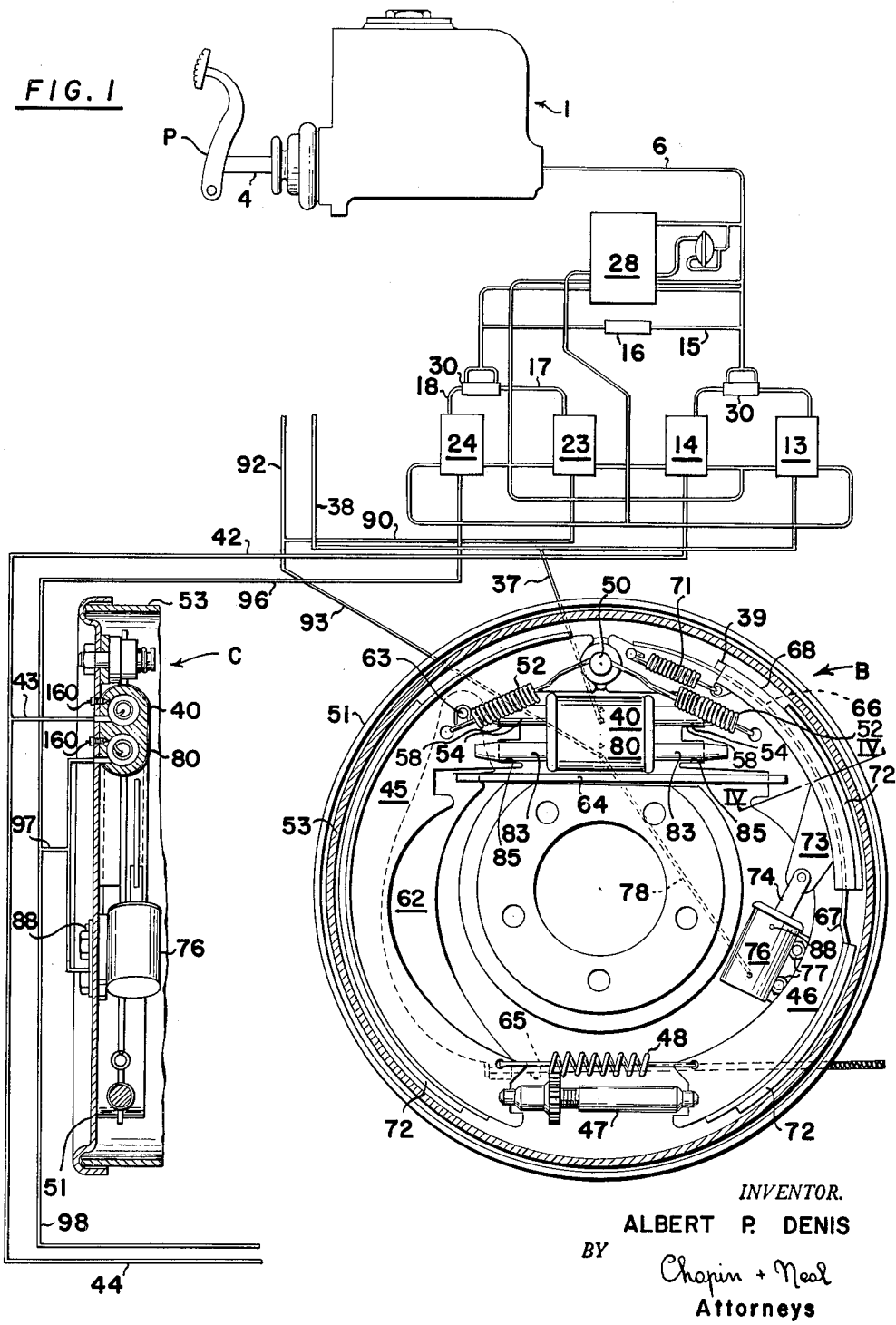
Figure 2:
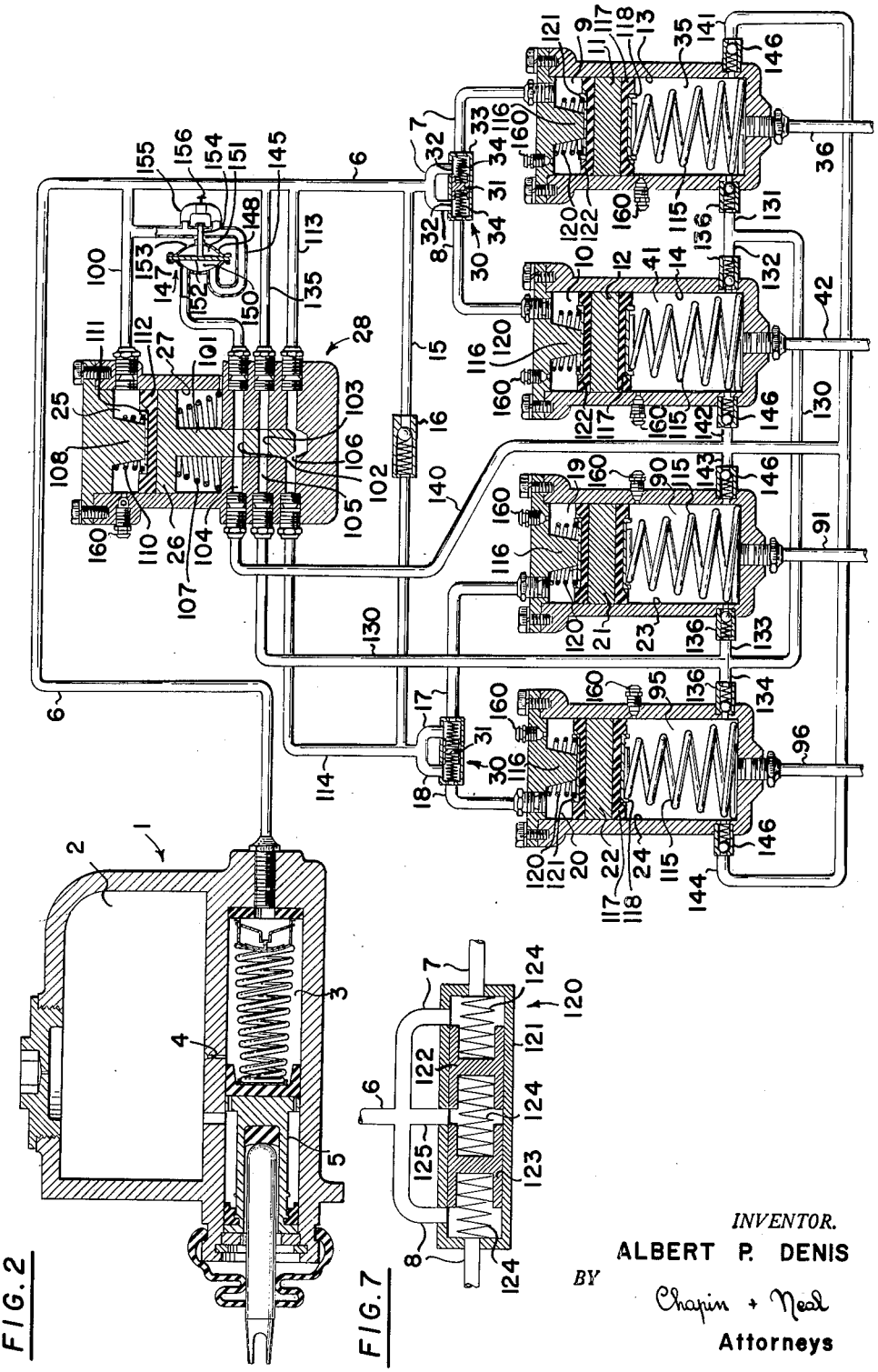

For purposes of illustration the invention is shown as applied to a four wheeled motor vehicle, the elements of the hydraulic system being diagrammatically shown in Fig. 6 where the left front and right front brakes are indicated respectively at A and B and the left rear and right rear brakes at C and D respectively. As generally indicated in Figs. 1, 2 and 6 the system comprises a conventional master cylinder generally indicated at 1 and which includes, as shown in Fig. 2, the fluid reservoir 2 from which fluid feeds to the cylinder 3 through opening 4. The piston 5 of cylinder 3 is connected to the brake pedal P, to be actuated thereby in any suitable or usual manner. A pipe line 6 leads from the cylinder 3 to the hydraulic system, which is normally filled with fluid, so that pressure on the foot pedal is hydraulically transmitted through the system to the brake actuating mechanisms served thereby.

In accoradnce with the present invention (see Fig. 2), upon actuation of the brake pedal P fluid pressure is supplied from master cylinder 3 through a line 6 and branch lines 7 and 8 to chambers 9 and 10 respectively above pistons 11 and 12 working in respective control cylinders 13 and 14. Simultaneously pressure is supplied through a branch line 15, containing a conventional check valve 16, and branch lines 17 and 18, respectively, to chambers 19 and 20 above pistons 21 and 22 working in the respective control cylinders 23 and 24. Simultaneously pressure is also supplied to chamber 25 above piston 26 working in cylinder 27 of a master check valve, generally indicated at 28, later described. Pressure is supplied from line 6 to branch lines 7 and 8 and from line 15 to branches 17 and 18 through respective balanced valves 30. Each valve 30 comprises a piston 31 normally held centered between ports 32 in a cylinder 33 by oppositely acting springs 34. The function and operation of the valves 30 will be later described.

The pressure thus applied by actuation of the foot pedal to chamber 9 of cylinder 13 is transmitted to the fluid in chamber 35, below piston 11 and thence through line 36 and (see Figs. 1 and 6) branches 37 and 38, to the brake actuating cylinders 40 of the two front wheel brakes A and B. Similarly the pressure applied to chamber 10 of cylinder 14 is transmitted to the fluid in chamber 41 below piston 12 and thence through line 42 and branches 43 and 44 to the brake actuating cylinders 40 of the two rear wheel brakes C and D.

Figure 3:
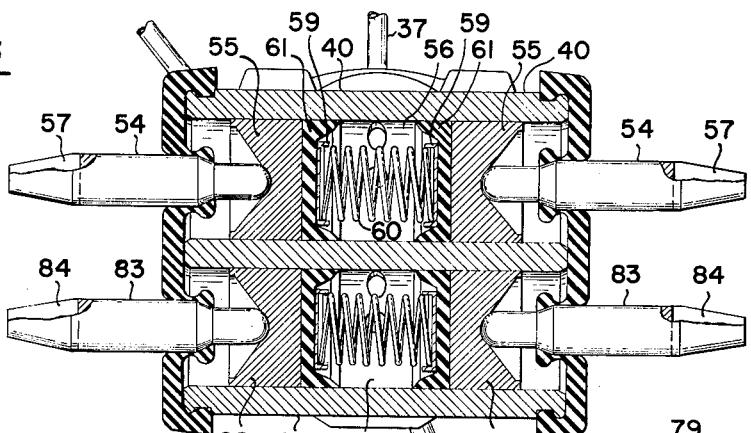
Fig. 3 is a sectional view, on a larger scale of the operative hydraulic cylinder associated with each brake assembly.

The brake mechanism at each wheel is similar, except for their right and left handedness. As best shown in Fig. 1 each brake includes brake shoes 45 and 46 having their lower ends engaging an adjustable spacer 47 and held thereagainst by a spring 48. The upper end of the brake shoes are normally held against a stud 50, fixed to housing member 51, by respective springs 52. The brake shoes are spread apart and into contact with the brake drum 53 of the wheel, to effect braking of the vehicle, by separation of the oppositely directed stems 54 of pistons 55 (Fig. 3) of the brake actuating cylinder 40 when pressure is supplied to the chamber 56 between the pistons 55 by actuation of the brake pedal P. The outer end of the stems 54 are forked as indicated at 57 to embrace the edges of the respective shoes 45—46 within notches 58 formed in the edge of the shoes. As shown in Fig. 3, these actuating cylinders are each provided with relatively light springs 60 between the pistons, the springs 60 being vastly overpowered by the springs 52 and serving merely to keep the flexible rubber sealing-heads 61 in proper position relative to the pistons. Metal discs 59 are positioned between the ends of the springs 60 and the sealing heads 61 to protect the latter and maintain them in sealing position. Referring again to Fig. 1, each brake also includes a lever 62 pivoted at its upper end, as at 63, to the shoe 45 and connected to the other shoe 46 by a sliding bar 64 by which arrangement the brake may be applied through a cable 65 connected to a usual form of hand operated lever, not shown, for parking purposes.

Figure 4:
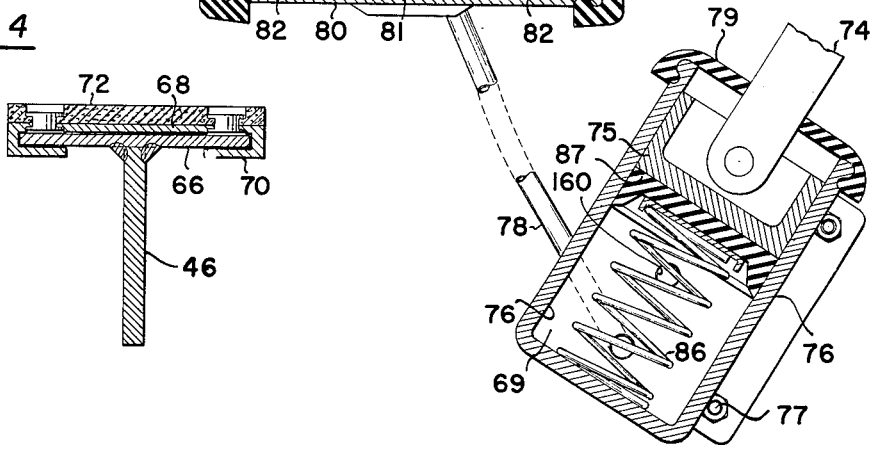
Fig. 4 is a sectional view, on a larger scale, substantially on line 4—4 of Fig. 1.

In general the mechanical structure of the wheel brakes as just described is, or can be, of conventional design as heretofore and presently used for unpowered hydraulic brakes. The brake structure of the invention departs, however, from standard practice in that the upper portion of the brake shoe 46, which is moved into contact with the leading or downwardly moving half of the rotating brake drum 53 to arrest the vehicle, is slidably mounted relative to the remainder of the shoe. As best shown in Figs. 1 and 4 the upper portion 66 of the flange of shoe 46 is offset radially inwardly as indicated at 67 and narrowed to slidably receive a shoe section 68, the edge portions of which are bent, as indicated at 70, Fig. 4, to embrace the edges of the narrowed portion of the flange and permit free sliding movement of section 68 on portion 66. A relatively light spring 71 normally retains section 68 against step 39 at the upper end of the shoe proper when the shoes 45 and 46 are in retracted non-braking position. Upon application of fluid pressure to cylinder 40 the shoes are moved into pressure contact with the drums 53 carried by the vehicle wheel, thus bringing the wheel to a stop. Assuming the vehicle is moving forwardly as the section 68 is moved into engagement with the leading half of the drum 53 which is moving downwardly, or clockwise, as viewed in Fig. 1, the frictional clutching engagement of section 68 with the downwardly moving drum, draws section 68 downwardly along portion 66 against the action of spring 71.

It will be understood that the brake shoes will be provided with the usual frictional lining as generally indicated at 72 in the various figures.

A lug 73 extends from section 68 and is connected by a pivoted link 74 to the piston 75 (Fig. 3) working in hydraulic cylinder 76. The cylinder 76 is fixed as by bolts 77 to housing member 51 and the chamber 69 below piston 75 is hydraulically connected by a pipe line 78 to a second brake actuating cylinder 80 which may be, and is shown as, similar in all essential structural respects to cylinder 40 previously described. The hydraulic fluid displaced from cylinder 76 enters the chamber 81 between pistons 82, in cylinder 80, the pistons 82 engaging stems 83, the outer ends of which are forked at 84 and engage in slots 85 in the edges of the brake shoes. Thus when braking pressure is applied to pedal P, pressure is transmitted to the cylinders 40 in each brake assembly, to thereby move the shoes 45 and 46 into frictional engagement with the rotating brake drum, the latter advances the sections 68 as previously described. The force behind and causing such movement of the sections 68 is translated hydraulically through cylinder 76 and line 78 to cylinder 80 thus providing a braking force, in addition to that applied to the foot pedal, powered from the kinetic energy of the moving vehicle transmitted by the moving brake drum. Since the kinetic energy of a moving body is measured $-m/2v^2$ where $m$ is the mass of the body and $v$ its velocity, the faster the car is moving when the brake is applied by foot lever P the greater the added braking power applied through the cylinders 80.

Pistons 75 of cylinders 76 are retracted, along with shoe sections 68, by spring 71 and by the return of fluid from cylinder 80 to cylinder 76 when fluid pressure is released from cylinders 40 and the brake shoes retracted by springs 52. A light spring 86 in each cylinder 76 assures that the sealing cap 87 will remain in proper position with respect to piston 75 throughout the movement of the latter. The upper end of cylinder 76 is closed by a rubber cap 79 having sufficient flexibility to accommodate the operative movements of link 74. The chamber between piston 75 and cap 79 is vented (Fig. 1) to the atmosphere by a vent 88.

Referring again to Fig. 2, as foot pedal pressure is being transmitted to the actuating cylinders 40 of the front wheel brakes via control cylinder 13 and line 36, and to the operating cylinders 40 of the rear wheel brakes via control cylinder 14 and line 42, foot pedal pressure is initially applied through line 15 and check valve 16 to the chambers 19 and 20 of cylinders 23 and 24. The pressure thus applied by actuation of the foot pedal to chamber 19 is transmitted to the fluid in chamber 90 below piston 21 and thence through line 91 and (see Figs. 1 and 6) its branches 92 and 93, to the cylinders 80 and 76 of the front wheel brakes. Similarly (Fig. 2) the pressure applied by the initial actuation of the foot pedal to chamber 20 is transmitted to the fluid in chamber 95 below piston 22 and thence through line 96 and (Figs. 1 and 6) its branches 97 and 98 to the cylinders 80 and 76 of the rear wheel brakes.

As previously mentioned actuation of the foot pedal P applies fluid pressure to chamber 25 (Fig. 2) of the master check valve 28, through a branch line 100. Piston 26 of the valve 28 carries a valve member 101 provided with transverse ports 102 and 103. The member 101 traverses passages 104, 105, and 106 in the body of valve 28. When the member 101 is in raised position, as in Fig. 2, the passages 104 and 105 are open through the ports 102 and 103 and passage 106 is open by the clearance beneath the end of member 101. In the absence of pressure exerted through branch 100 a spring maintains the member 101 in the valve open position of Fig. 1, the upper position of member 101 being determined by a stop member 108. A light spring 110 surrounding stop 108 engages a flanged metal disc 111 to maintain a sealing head 112 against piston 26 in all positions of movement of the piston. The spring 107 is of sufficient strength to momentarily resist the initial pressure exerted through line 100 but is ineffective to resist the increasing pressure as the foot pedal is advanced to apply breaking pressure, thus member 101 closes the passages 104, 105 and 106, and the valve member 101 acts to close these passages prior to the application of "power" to the brakes by the cylinders 80. Pedal originated pressure is initially applied to the chambers 19 and 20 of control cylinders 23 and 24 through branch line 113, passage 106 and line 114, as well as line 15. Back flow of fluid through passage 106 is prevented when valve member 101 closes the latter passage and back flow through line 15 is prevented at all times by the check valve 16. Thus when "powered" pressure is applied to the brake cylinders 80 by the power cylinders 76 the resulting increase in pressure in lines 91 and 96 and chambers 90 and 95 cannot move pistons 21 and 22 upwardly since the fluid above these pistons is trapped by the now closed master check valve 28 and the check valve 16 in line 15. Since lines 36 and 42 and the brake cylinders 40 supplied thereby are not in communication with the power cylinders 76 and 80 the pressure in chambers 35 and 41 of control cylinders 13 and 14 does not increase above the foot pressure applied through pedal P.

Springs 115 in the chambers 35, 41, 90 and 95 tend to maintain the pistons 11, 12, 21 and 22 in their upper or neutral position against stops 116 carried by the cylinder heads. The springs 115 also maintain sealing heads 117 in place, discs 118 being interposed between the springs and heads. Light springs 120, surrounding stops 116 acting through discs 121 maintain sealing heads 122 against the upper faces of the pistons.

Assuming the entire system is properly filled with fluid, and that all the lines and cylinders of the system are intact application of foot pressure to pedal P transmits such pressure to the chambers 9, 10, 19 and 20 of the four control cylinders and such pressure is transmitted by the resulting movement of the pistons 11, 12, 21 and 22 to the brake cylinders 40 and 80 to move the brake shoes at each wheel into pressure contact with the adjacent brake drum. Resulting frictional engagement of the movable shoe sections 68 cause the latter to advance and apply powered pressure to the fluid in the associated power cylinders 76 which pressure is applied to the brake shoes by the respective cylinders 80.

In the event that a break occurs in line 36, one of its branches or the cylinders 40 served thereby, only the pedal imparted pressure exerted on the front wheel brake shoes is lost. The "powered" braking action is maintained since pedal pressure will be exerted on the front wheel power cylinders 80 by pressure supplied by line 15 to the control cylinder 23 thus providing sufficient frictional pressure on the shoe sections 68 to actuate the power cylinders 76 of the front wheel brakes. Only the fluid in chamber 35 and line 36 and the parts connected therewith is subject to loss. If a break occurs in line 42 only the rear cylinders 40 and chamber 41 of control cylinder 14 will be similarly affected. Even if both lines 36 and 42 break or otherwise lose their fluid the "powered" cylinders 80 of all four wheels remain effective and responsive to pressure on pedal P.

In the event of a break in one of the lines 91 or 96, or the parts supplied thereby, "powered" braking will be lost to the front or rear wheels, or to all four wheels if both lines 91 or 96 break, but in either event the pedal actuated cylinders 40 remain effective, so long as they and their lines remain tight.

As best shown in Fig. 6 line 36 from control cylinder 13 serves only the cylinders 40 of the two front wheel brakes A and B while line 42 of control cylinder 14 serves only the wheel cylinder 40 of the two rear wheel brakes C and D. Similarly line 91 of control cylinder 23 serves only the cylinders 80 and 76 of the front wheel brakes A and B while line 96 of control cylinder 24 serves only cylinders 80 and 76 of the rear wheel brakes C and D. It will be seen that the respective fluid circuits from the chambers 13, 14, 90 and 95 of the several control valves are, except for check valve guarded interchange lines shortly to be described, independent of each other and of the circuit from the master cylinder so that in the event of rupture in any one of the lines 36, 42, 91 and 96 or the parts served thereby only the fluid in that circuit will be lost. For example, a rupture or substantially leak in line 36 may result in the evacuation of chamber 13, so that the pressure applied on the fluid in chamber 9 from master cylinder 3 will tend to bottom piston 11 or force the evacuation of chamber 35 and line 36 through the rupture or leak. The valve 30 (Fig. 2) through which fluid is supplied to chambers 9 and 10 serve to minimize or delay such evacuation. In the event of a rupture in line 36 the resulting decrease of resistance to flow in line 7 will cause normally balanced valve member 31 to move to close branch 7 and similarly a brake in line 42 will result in a closure of line 8. Valve 30 in lines 17 and 18 to control cylinders 23 and 24 act similarly in the event of rupture of lines 91 and 96. As will be apparent in the event of ruptures in both lines 36 and 42 (or 96 and 91) so that the pressures in chambers 9 and 10 (or 19 and 20) again become equal, the members 31 of valves 30 will again remain centered. If it is desirable to prevent this a valve such as that shown at 120, Fig. 7, may be used in place of the valves 30. Valve 120 comprises a cylinder 121 in which two valve members 122 and 123 are normally held in balance spaced relation from each other and the ends of the cylinder 121 by springs 124. Line 7 passes through the chamber at one end of cylinder 121 and line 8 through the chamber at the other end. A connection 125 connects line 6 directly to the chamber between members 122 and 123. In the event of a rupture-caused decrease in pressure in line 7 member 122 will move to close that line, as described with reference to valve 30, and in the event of a rupture-caused decrease in pressure in line 8 member 123 will similarly move to close line 8. In the event of a rupture-caused decrease of pressure in both lines 7 and 8 the pressure imposed between the members 122 and 123 through connection 125 will effect the closure of both lines 7 and 8.

In the absence of such valves as 30 or 120 the "softness" in response to pedal applied pressure will be more clearly felt by the operator and such softness is, of course, indicative that leakage or rupture has occurred and that inspection should be made. The presence of valves such as 30 or 120 tend to lessen the extent and duration of the "soft" response and such valves may cut off brake actuating cylinders which still have some braking effectiveness. For these reasons it may be preferable to omit the valves 30.

While the fluids commonly used in hydraulic brake systems are substantially incompressible, they do expand and contract in response to increases or decreases in temperature. In order to avoid an unintentional application of braking pressure because of heat caused fluid expansion and to maintain the systems full of fluid in the event of fluid contraction means are provided for compensating for such temperature caused volumetric changes in the fluid.

As will be apparent from Fig. 2 fluid can flow freely to and from supply chamber 2 of the master cylinder 1 and chambers 9 or 10, of control cylinders 13 and 14, and chamber 25, of master check valve 28, upon any expansion or contraction of the fluid. It will also be apparent that when the brakes are in released condition and valve member 101 of check valve 28 is in its upper position that fluid can similarly flow to and from supply chamber 2 and chambers 19 and 20, of control cylinders 23 and 24, via branch line 113 and passage 106, the latter being closed when pressure is applied to chamber 25 as and for the reasons previously described.

The chambers 35, 41, 90 and 95 are connected by line 130 and respective branches 131, 132, 133, and 134 to passage 105 which communicates through line 135 with line 6 and supply chamber 2 of the master cylinder. The several branch lines 131, 132, 133 and 134 are connected to their respective control cylinders through respective check valves 136, which open under increased pressure in the adjacent chambers of the control cylinders, thus permitting excess fluid resulting from heat expansion to flow back to supply chamber 2. As previously described passage 105 is closed by member 101 of the master check valve 28 upon application of pressure to brake pedal P.

The chambers 35, 41, 90 and 95 are connected by a line 140 and respective branches 141, 142, 143 and 144 to passage 104 of master check valve 28. Passage 104 communicates through branch lines 145 and 100 with line 6 and supply chamber 2 of the master cylinder 1. The several branch lines 141, 142, 143 and 144 are connected to their respective control chambers through respective check valves 146, which open in response to a negative pressure resulting from contraction of the fluid in the adjacent chambers of the control cylinders. Line 145 is controlled by a diaphragm controlled valve 147. Valve 147 comprises a housing 148 which is divided into two chambers 150 and 151 by a diaphragm 152. Chamber 150 is in series with line 145 while chamber 151 is vented to the atmosphere through a vent 153. The diaphragm 152 carries a valve member 154 which closes line 145 when pressure equal to, or in excess of, atmospheric pressure is present in chamber 150. For purposes of filling the system valve member 154 is bypassed by a line 155, normally closed by a shut-off vanes 156 which is opened for filling purposes. Contraction of the fluid in chambers 35, 41, 90 and 95 resulting in a negative pressure therefor opens valves 146 and valve 151 permitting additional fluid to be drawn from supply chamber 2 of the master cylinder to restore the capacity volume of fluid in chambers 35, 41, 90 and 95 and the lines and parts in communication therewith. As previously described passage 104 is closed by valve member 101 when the braking system is in operation.

By the arrangements described the independence of the hydraulic systems associated with the lines 36, 42, 91 and 96 is positively assured during brake operation.

Figure 5:
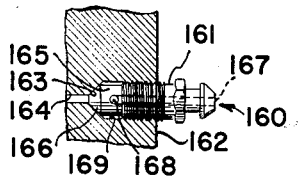
Fig. 5 is a detail view of one of the venting plugs.

In order to permit initial filling or refilling of the hydraulic system as a whole, or parts thereof which have for any reason been drained, the various chambers are provided with vent plugs 160 as indicated in the drawings. These vent plugs 160 which may be of conventional form, as shown in Fig. 5, comprise a plug portion 161 threaded into a bore 162, formed in the wall of the cylinder it serves, the inner end of the bore being tapered as at 163 and communicating with the chamber of the cylinder through a passage 164. The inner portion 165 of the plug is reduced in diameter and the inner end is tapered as at 166 to make a sealing engagement with tapered seat 163 when the plug is turned inward to its fullest extent. The plug is provided with a central passage 167 which terminates short of the inner end of the plug and communicates with a transverse passage 168 opening through the face of the reduced portion 165 to the annular chamber 169 formed between the reduced portion 165 and the adjacent wall of bore 162. As will be apparent when the plug 160 is backed from seat 163 a vent passage is formed through passage 164, chamber 169, and passages 168 and 167 for the escape of air as the associated chambers are filled with oil.

As will be apparent the various plugs are so positioned, that the various chambers and lines of the hydraulic system may be filled through line 6 without air entropment, the various plugs being closed when oil is discharged through the passages 167. It will be understood that the dimensions and capacities of the various cylinders and lines will be made to accord with the work they are called upon to do.

While the master check valve 28 and the control cylinders 13, 14, 23 and 24 are shown structurally spaced from each other, for the sake of clearness, it will be understood that they may be formed as a block with common walls or otherwise structurally associated for accommodation to the environment in which the system is used. The invention has been illustrated as applied to the braking system of a four wheeled vehicle where preservation of braking service under the various hazards of road travel is a major object. It will be understood, however, that the various functional advantages described have utility for braking purposes generally, in the control of heavy rotating members in large earth moving equipment, heavy duty cable winding drums and other uses where hydraulic operation, under remote or immediate control is desired, and that changes in structure and arrangements to meet the requirements of a specific use may be made within the scope of the appended claims.

What is claimed is:

1. In a hydraulically operated braking system, frictionally engageable rotatable and non-rotatable brake members, first and second brake actuating cylinders for initially and commonly moving said brake members into frictional engagement, first and second double headed control cylinders each having a floating piston therein separating the interior of the control cylinders into first and second chambers, a master hydraulic cylinder, respective lines hydraulically connecting said master cylinder to the first chamber of each of said control cylinders to supply pressure thereto, hydraulic lines connecting the second chambers of said first and second control cylinders to said first and second brake actuating cylinders respectively, a power cylinder hydraulically connected to said second brake actuating cylinder, a friction clutch member movable into engagement with the rotatable brake member, means to move said clutch member into driven engagement with the rotatable brake member, upon actuation of either the first or second brake actuating cylinders, to power said power cylinder from the torque of said rotatable brake member, a cut off valve in the line supplying pressure to said first chamber of the second control cylinder and means responsive to a predetermined pressure in said line to automatically actuate said cut-off valve to close said line prior to the application of substantial pressure to said second brake actuating cylinder by said power cylinder.

2. In a hydraulically operated braking system as in claim 1, a second hydraulic connection between said master cylinder and the first chamber of the second control cylinder, said second connection by-passing said cut off valve, and a constantly operable check valve in said second connection, preventing flow therethrough in the direction of the master cylinder.

3. In a hydraulically operated braking system as in claim 2, two additional passages controlled by said cut off valve and connected respectively at one end to said master cylinder, one of said passages being hydraulically connected at the other end to each of said second chambers of the control cylinders through respective constantly acting check valves permitting transfer of fluid, when said cut off valve is open, from said second chambers to the master cylinder in the event fluid expansion-caused pressure is present in the second chambers of the control cylinders, the second of said two passages being hydraulically connected at the other end to each of said second chambers of the control cylinders through respective constantly acting check valves permitting transfer of fluid to said chambers, when said cut off valve is open and the pressure in the chambers is negative due to fluid contraction, the hydraulic connection of said second passage to the master cylinder containing a vacuum controlled valve, normally closed but opening in response to a negative pressure in said second passage to permit transfer of fluid from the master cylinder through said second passage to the said second chambers of the control valve.

4. In a hydraulically operated braking system, a rotatable brake drum and a non-rotatable brake shoe, first and second brake actuating cylinders for moving said shoe into frictional contact with said drum, first and second double headed control cylinders each having a floating piston therein separating the interior of the control cylinders into first and second chambers, a master hydraulic cylinder, respective lines hydraulically connecting said master cylinder to the first chamber of each of said control cylinders to supply pressure thereto, hydraulic lines connecting the second chambers of said first and second control cylinders to said first and second brake actuating cylinders respectively, a power cylinder hydraulically connected to said second brake actuating cylinder, said shoe having a section mounted for limited sliding movement relative to the remainder of the shoe, means connecting said section to said power cylinder to power the latter by movement of said section when the latter is brought into frictional driven engagement with the drum by movement of the shoe into contact with the drum, a cut off valve in the line supplying pressure to said first chamber of the second control cylinder and means responsive to a predetermined pressure in said line to automatically actuate said cut-off valve to close said line prior to the application of substantial pressure to said second brake actuating cylinder by said power cylinder.

5. A hydraulically operated braking system for a four wheeled vehicle having frictionally engageable rotatable and non-rotatable brake members at each wheel, first and second brake actuating cylinders at each wheel for moving said brake members into engagement, first, second, third and fourth, double headed control cylinders each having a floating piston therein separating the interior of each control cylinder into first and second chambers, a master hydraulic cylinder hydraulically connected to the first chamber of each control cylinder to supply pressure thereto, a hydraulic line connecting the second chamber of said first control cylinder to the first brake actuating cylinders of the two front wheels, a hydraulic line connecting the second chamber of said second control cylinder to the first brake actuating cylinders of the two rear wheels, a hydraulic line connecting the second chamber of said third control cylinder to the second brake actuating cylinders of the two front wheels, a hydraulic line connecting the second chamber of said fourth control cylinder to the second brake actuating cylinders of the two rear wheels.

6. A hydraulically operated braking system for a four wheeled vehicle having frictionally engageable rotatable and non-rotatable brake members at each wheel, first and second brake actuating cylinders at each wheel for moving said brake members into engagement, first, second, third and fourth, double headed control cylinders each having a floating piston therein separating the interior of each control cylinder into first and second chambers, a master hydraulic cylinder, respective lines hydraulically connecting said master cylinder to the first chamber of each control cylinder to supply pressure thereto, a hydraulic line connecting the second chamber of said first control cylinder to the first brake actuating cylinders of the two front wheels, a hydraulic line connecting the second chamber of said second control cylinder to the first brake actuating cylinders of the two rear wheels, a hydraulic line connecting the second chamber of said third control cylinder to the second brake actuating cylinders of the two front wheels, and a hydraulic line connecting the second chamber of said fourth control cylinder to the second brake actuating cylinders of the two rear wheels, a power cylinder at each wheel hydraulically connected to the adjacent said second brake actuating cylinder, a friction clutch member at each wheel, means to move said member into driven engagement with the adjacent movable brake member upon actuation of said movable brake members to power the adjacent power cylinder from the torque of the rotatable brake member, a cut off valve in the line supplying pressure to said first chambers of the third and fourth control cylinders, and means responsive to a predetermined pressure in said last-mentioned line to automatically actuate said cut-off valve to close the latter prior to the application of substantial pressure to the second brake actuating cylinders by the power cylinders.

7. A hydraulically operated braking system as in claim 6, the pressure supply from the master cylinder to the first chambers of the first and second control cylinder and to the first chambers of the third and fourth control cylinders being through respective spring balanced valves automatically closing the pressure supply to the first chamber of the control cylinder supplied thereby in the event of material loss of pressure in the second chamber of such control cylinder.

8. In a hydraulically operated braking system as in claim 6, a second hydraulic connection between said master cylinder and the first chambers of the third and fourth control cylinders, said second connection by-passing said cut off valve, and a constantly operable check valve in said second connection preventing flow therethrough in the direction of the master cylinder.

9. In a hydraulic system as in claim 8 two additional passages controlled by said cut off valve and connected respectively at one end to said master cylinder, one of said passages being hydraulically connected at the other end to each of said second chambers of the control cylinders through respective constantly acting check valves permitting transfer of fluid, when said cut off valve is open, from said second chambers to the master cylinder in the event fluid expansion-caused pressure is present in the second chambers of the control cylinders, the second of said two passages being hydraulically connected at the other end to each of said second chambers of the control cylinders through respective constantly acting check valves permitting transfer of fluid to said chambers, when said cut off valve is open and the pressure in the chambers is negative due to fluid contraction, the hydraulic connection of said second passage to the master cylinder containing a vacuum controlled valve, normally closed but opening in response to a negative pressure in said second passage to permit transfer of fluid from the master cylinder through said second passage to the said second chambers of the control valve.

10. In an hydraulically operated braking system, frictionally engageable rotatable and non-rotatable brake members, a brake actuating cylinder for moving said brake members into frictional engagement, a control cylinder having a floating piston therein separating the interior of the control cylinder into first and second chambers, a master cylinder, a line hydraulically connecting the master cylinder to said first chamber, a line hydraulically connecting said second chamber to said brake actuating cylinder, a power cylinder hydraulically connected to said brake actuating cylinder, a friction clutch member connected to said brake actuating cylinder to be moved into driven engagement with the rotatable brake member upon actuation of said brake actuating cylinder to power said power cylinder from the torque of said rotatable brake member, cut-off valve means in the first-mentioned line for closing said first-mentioned line, and actuating means, responsive to pressure applied thereto from the master cylinder, to close said valve means prior to the application of substantial pressure to said brake actuating cylinder from said power cylinder.

11. In an hydraulically operated brake system as in claim 10, a second line hydraulically connecting the master cylinder to said first chamber by-passing said cut-off valve means, and a constantly operable check valve in said second line preventing flow therethrough in the direction of the master cylinder.

12. In an hydraulically operated braking system, frictionally engageable rotatable and non-rotatable brake members, a brake actuating cylinder for moving said brake members into frictional engagement, a control cylinder having a floating piston therein separating the interior of the control cylinder into first and second chambers, a master cylinder, a line hydraulically connecting the master cylinder to said first chamber, a line hydraulically connecting said second chamber to said brake actuating cylinder, a power cylinder hydraulically connected to said brake actuating cylinder, a friction clutch member connected to said brake actuating cylinder to be moved into driven engagement with the rotatable brake member upon actuation of said brake actuating cylinder, to power said power cylinder from the torque of said rotatable brake member, a line hydraulically connecting the master cylinder to said second chamber, cut-off valve means in the first and last mentioned lines for closing said first and last mentioned lines, and actuating means, responsive to pressure applied thereto from the master cylinder, to close said cut-off valve means prior to the application of substantial pressure to said brake actuating cylinder from said power cylinder, to prevent back pressure from said power cylinder on the master cylinder when said cut-off valve means are closed but permitting transfer of fluid from said chambers to the master cylinder, when the cut-off valve means are open, in the event fluid expansion-caused pressure is present in said chambers.

13. In an hydraulically operated brake system as in claim 12, a second line hydraulically connecting the master cylinder to the second chamber, a vacuum controlled valve in said second line, said vacuum controlled valve being normally closed but opening in response to negative pressure in said second line to permit transfer of fluid from the master cylinder to the second chamber.

References Cited in the file of this patent

UNITED STATES PATENTS

| 2,209,343 | Masteller | July 30, 1940 |
| 2,529,306 | Morris | Nov. 7, 1950 |

FOREIGN PATENTS

| 663,403 | Germany | Aug. 6, 1938 |